United States Patent [19]

Beard

[11] Patent Number: 5,360,538
[45] Date of Patent: Nov. 1, 1994

[54] MIXED LIQUOR WASTING SYSTEM

[76] Inventor: Harold J. Beard, 1111 Colonial Dr., Baton Rouge, La. 70806

[21] Appl. No.: 796,076

[22] Filed: Nov. 20, 1991

[51] Int. Cl.$^5$ .............................................. C02F 3/18
[52] U.S. Cl. .................... 210/96.1; 210/104; 210/137; 210/195.1; 210/926
[58] Field of Search ............ 210/614, 622, 628, 629, 210/96.1, 194, 195.1, 202, 534, 926, 137, 104

[56] References Cited

U.S. PATENT DOCUMENTS

| | | |
|---|---|---|
| 3,905,904 | 9/1975 | Cherne et al. ........................ 210/926 |
| 4,383,922 | 5/1983 | Beard .................... 210/170 |
| 4,614,589 | 9/1986 | Weis ................... 210/629 |

FOREIGN PATENT DOCUMENTS 2075856 11/1981 United Kingdom ................ 210/926

Primary Examiner—Ivars Cintins
Attorney, Agent, or Firm—Robert C. Tucker; William David Kiesel

[57] ABSTRACT

In an extended aeration wastewater treatment system having wastewater flowing into a retention basin so as to form mixed liquor within the retention basin, a mixed liquor wasting system is provided, comprising a thickener tank, having a sidewall and a bottom; a waste line having a first end and a second end, the first end fluidly connected to the retention basin, and the second end fluidly connected to the thickener tank; a first flow control device, such as a pump, for continuously removing a portion of the mixed liquor from the basin at a desired constant flow rate through the waste line, positioned in the waste line; a sludge removal line having a first end and a second end, the first end fluidly connected to the bottom of the thickener tank, and the second end fluidly connected to a sludge disposal system; a second flow control device, such as a pump, for removing a concentrated portion of the mixed liquor from the thickener tank, positioned in the sludge removal line; and a return line having a first end and a second end, the first end fluidly connected to the thickener tank above the bottom, and the second end fluidly connected to the retention basin. A method for wasting mixed liquor is provided, comprising the step of continuously removing a portion of the mixed liquor from the basin at a desired constant flow rate.

15 Claims, 4 Drawing Sheets

MIXED LIQUOR WASTING SYSTEM

BACKGROUND OF THE INVENTION

1. Field of the Invention

This invention relates generally to aerobic wastewater treatment systems and methods and, more particularly, to aerobic wastewater treatment systems and methods which utilize a moving stream of mixed liquor in a retention basin, such as an oxidation ditch.

2. Prior Art

In many aerobic wastewater treatment systems wastewater flows into a retention basin, such as an oxidation ditch, where the wastewater is retained as mixed liquor. In a conventional oxidation ditch system, a continuous channel contains the flowing mixed liquor, which is aerated as it flows around the channel to provide oxygen for microorganisms which decompose the waste in the channel. Thus, as waste is decomposed in the basin, suspended solids form in the mixed liquor. Clarifiers are used to clarify the mixed liquor by settling the suspended solids and removing clarified wastewater from the system. Intrachannel clarifiers may be employed for this purpose. Examples of intrachannel clarifiers may be seen in Harold J. Beard's U.S. Pat. Nos. 4,362,625; 4,383,922; and 4,457,844. Maintenance of the proper biological balance in the basin is essential for proper operation of the system.

Various measures are used for maintenance of proper biological activity. One such measure is known as "sludge age". For a given concentration of waste entering the basin and a given concentration of waste within the basin, the sludge age can be calculated. Thus, the number of pounds of waste within the basin divided by the number of pounds of waste per day entering the basin will yield a sludge age in days. It has been found empirically that a sludge age of 23-25 days will yield excellent biological activity within the basin.

Since only clarified wastewater is taken from the system, the solids concentration within the basin increases as wastewater continues to flow into the basin, increasing the sludge age. Varying concentrations of wastewater entering the basin over time also vary the sludge age. The retention of solids in the basin requires that mixed liquor be wasted from the basin in order to maintain a desirable sludge age. Overwasting or underwasting can result in disastrous biological consequences. Prior art wasting was accomplished by observation of basin conditions and occasionally opening a waste valve or operating a waste pump, guessing at the amount of solids removed from the basin. Prior art wasting methods require expert system operators. Further, variations in operating conditions often result in unforseen variations in sludge age, regardless of the skill of the operator.

An additional problem is created when wasting mixed liquor. Mixed liquor exiting a basin has a very high water content. Thus, in order to dispose of a small amount of solids, a very large volume of mixed liquor must be removed. The wasted mixed liquor must be processed in digesters or other similar sludge disposal systems.

SUMMARY OF THE INVENTION

Therefore it is an object of this invention to provide a mixed liquor wasting system and method which maintains a constant sludge age in an aerobic retention basin.

It is another object of this invention to provide a mixed liquor wasting system and method which thickens the wasted mixed liquor before disposal.

Accordingly, in an extended aeration wastewater treatment system having wastewater flowing into a retention basin so as to form mixed liquor within the retention basin, a mixed liquor wasting system, comprising a thickener tank, having a sidewall and a bottom; a waste line having a first end and a second end, the first end fluidly connected to the retention basin, and the second end fluidly connected to the thickener tank; a first flow control device, such as a pump, for continuously removing a portion of the mixed liquor from the basin at a desired constant flow rate through the waste line, positioned in the waste line; a sludge removal line having a first end and a second end, the first end fluidly connected to the bottom of the thickener tank, and the second end fluidly connected to a sludge disposal system; a second flow control device, such as a pump, for removing a concentrated portion of the mixed liquor from the thickener tank, positioned in the sludge removal line; and a return line having a first end and a second end, the first end fluidly connected to the thickener tank above the bottom, and the second end fluidly connected to the retention basin. A method for wasting the mixed liquor is provided, comprising the step of continuously removing a portion of the mixed liquor from the basin at a desired constant flow rate.

DETAILED DESCRIPTION OF PREFERRED EMBODIMENTS OF THE INVENTION

Figure 1:
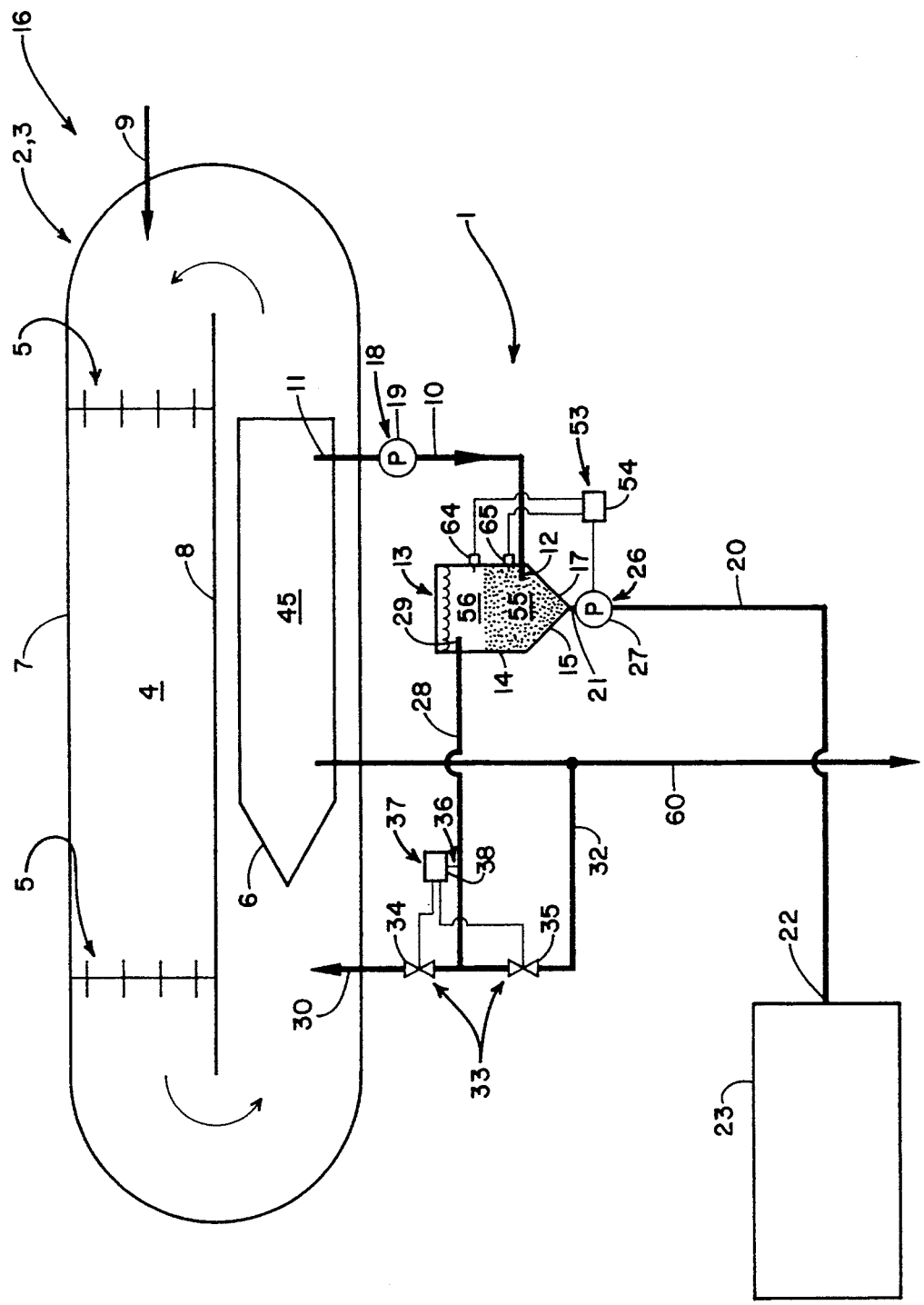
FIG. 1 is a schematic depiction of an embodiment of the system of the invention.

As shown in FIG. 1, a mixed liquor wasting system 1 is attached to an extended aeration wastewater treatment system 16. Treatment system 16 includes a retention basin 2, shown in the form of an oxidation ditch 3. Oxidation ditch 3 is formed by a continuous outer wall 7 and a partition wall 8. Untreated wastewater enters the basin 2 through wastewater inlet 9 and is retained in the basin 2, where it is aerated by aerators 5. Collected wastewater in ditch 3 forms a mixed liquor 4, which is retained and circulated in the ditch 3 for a desired period of time, allowing microorganisms to decompose the waste in the water. Many different types of extended aeration systems 16 are used in the art. Most employ some sort of retention basin 2, to which the invention 1 may be attached. Without the intent of limitation, the invention 1 will be discussed herein in conjunction with systems 16 utilizing oxidation ditches 3.

Once the mixed liquor 4 is adequately treated, decomposed waste in the form of suspended solids must be removed through settlement, filtration or both. Separation between sludge (settled suspended solids) and clarified wastewater can be accomplished inside of oxidation ditch 3 through the use of an intrachannel clarifier 6, as shown in FIG. 1. A retention basin exit line, such as intrachannel clarifier outlet line 60 removes clarified wastewater from the ditch 3, and sludge is returned to the ditch 3. An external clarifier 57, shown in FIG. 2, may also be employed to accomplish the same task. Mixed liquor 4 flows into external clarifier 57 from ditch 3 through a retention basin exit line, such as external clarifier inlet line 58. Clarified wastewater exits clarifier 57 through external clarifier outlet line 59. Again, sludge is returned to the ditch 3 or occasionally wasted to a sludge disposal system.

Figure 6:
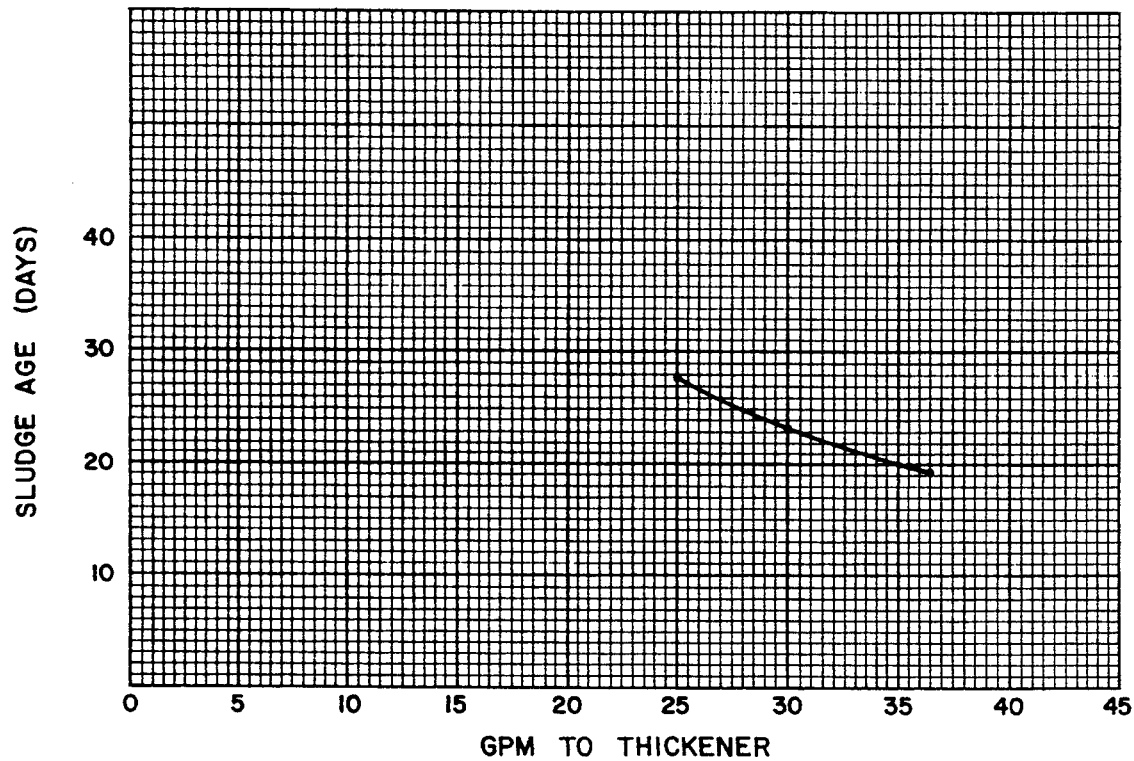
FIG. 6 is a curve showing the relationship of retention basin sludge age versus pumping rate to the thickener tank.

As discussed above, one major problem associated with extended aeration wastewater treatment systems 16 is the maintenance of proper biological conditions. It is accepted that maintaining a constant sludge age is effective in maintaining proper basin biology. The inventor has discovered that the continuous removal of a portion of the mixed liquor 4 from the basin 2, through waste line 10, at a constant flow rate will result in a constant sludge age within the basin 2. This is true on an average basis regardless of the concentration (BOD) of the incoming waste or the flow rate of the incoming waste. As the concentration and/or flow rate changes, the constant withdrawal rate through waste line 10 will cause the ditch conditions to re-establish equilibrium at the same sludge age. Equilibrium is reached when the mass of suspended solids leaving the ditch 3 through waste line 10 equals the mass of suspended solids entering the ditch 3 through wastewater inlet 9. If the constant flow rate through waste line 10 is changed, ditch conditions will again re-establish equilibrium at a new constant sludge age associated with the new flow rate through waste line 10. FIG. 6 depicts a design curve for maintenance of a constant sludge age for a one million gallon per day oxidation ditch. Thus, in order to maintain a sludge age of 23 days, a constant flow of 30 gallons per minute per million gallons of daily basin capacity should be maintained through waste line 10.

While maintaining a constant flow rate through waste line 10 maintains a constant sludge age, stabilizing basin conditions, something must be done with the suspended solids being removed from the basin 2 through waste line 10. Because of the large water content in the mixed liquor, it is desirable to thicken the sludge prior to further processing in order to reduce handling costs and disposal volumes. In order to accomplish this goal a thickener tank 13 was designed to concentrate suspended solids for disposal while returning clarified wastewater to the basin 2 or to a clarifier outlet line 59,60.

As discussed above, waste line 10 has a first end 11 fluidly connected to basin 2 and a second end fluidly connected to thickener tank 13. A first flow control means 18 for continuously removing a portion of mixed liquor 4 from basin 2 at a desired constant flow rate, is fluidly connected to basin 2. Preferably, first flow control means 18 comprises a first pump 19, although gravity flow control could be utilized where feasible. A gravity flow device could be a flow control weir (not shown) connected to return line 28, thus establishing a substantially constant flow through waste line 10 and thickener tank 13. First pump 19 may be set at a desired constant flow rate in order to accomplish the method of the invention.

Figure 3:
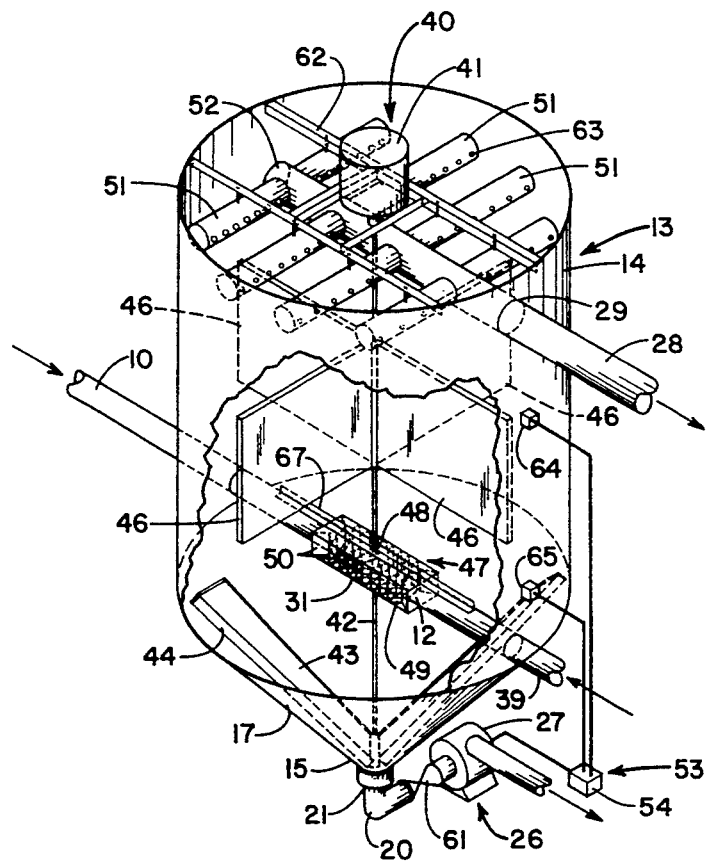
FIG. 3 is a perspective view of an embodiment of the thickener tank of the invention.

As shown in FIG. 3, thickener tank 13 is has a sidewall 14 (circular in the embodiment shown) and a bottom 15. Preferably, bottom 15 has a sloped portion 17 (preferably at an angle no less than thirty-five degrees with horizontal), sloping inward from sidewall 14 to encourage sludge concentration at bottom 15. A sludge removal line 20 has a first end 21 fluidly connected to bottom 15 and a second end 22 fluidly connected to a sludge disposal system 23. Sludge disposal system 23 can include such conventional components as a digester 24 having aerators 25 located therein. A second flow control means 26 is fluidly connected to thickener tank 13. Preferably, second flow control means 26 includes a second pump 27, positioned in sludge removal line 20. Pump 27 may operate intermittently or continuously at a relatively slow rate to remove accumulated sludge from tank 13. A bottom valve 61 is provided in sludge removal line 20 for additional control. If gravity drain to sludge disposal system 23 is possible, means 26 may comprise only bottom valve 61, which may be intermittently or continuously opened (either manually or electronically) to remove accumulated sludge.

At the top of thickener tank 13 is a support structure 62, supporting a mixer 40, including a motor 41, a shaft 42 rotatably attached to motor 41, and a blade 43 fixedly attached to shaft 42 just above bottom 15. Preferably, blade 43 extends to either side of shaft 42 as shown, and is oriented parallel to bottom 15. A resilient scraper extension 44, preferably made of pliable material, such as rubber, is fixedly attached to blade 43 and extends downward so as to lightly touch bottom 15 so as to eliminate any dead zones beneath blade 43. It has been found that, by operating mixer 40 so as to turn blade 43 at a tip speed of twenty feet per minute (three revolutions per minute for a 1.208 foot blade radius), gas build-up from de-nitrification is released preventing sludge floatation from de-nitrification. It is believed that the tip speed for blade 43 should be designed to be twenty to twenty-five feet per minute so as to achieve proper mixing and yet create minimum turbulence.

To dampen any turbulence produced within thickener tank 13, at least one baffle 46 is provided just above the entry point of waste line 10 and below collector pipes 51. Although any arrangement which dampens turbulence will suffice, the X-shaped arrangement of baffles 46 shown in FIG. 3 appears to be effective.

Mixed liquor 4 enters thickener tank 13 through waste line 10 and is dispersed by inlet diffuser 47. Waste line 10 should enter tank 13 at a point above bottom 15 such that 30–40 percent of the volume of tank 13 is below diffuser 47 to allow for sludge accumulation. Diffuser 47 includes a top plate 48 and bottom plate 31. Baffles 50 are contained between and around the periphery of plates 48,31 and serve to dampen inlet flow and allow sludge to begin to settle immediately upon entry into tank 13. Baffles 50 and holes 49 in bottom plate 31 allow mixed liquor to flow both horizontally outward from between plates 48,31 and downward through holes 49 in bottom plate 31. Diffuser 47 is supported by support angle 67, connected to waste line 10 and recycle line 39. When recycle line 39 is employed, it should enter tank 13 through diffuser 47 opposite waste line 10, as shown in FIG. 3, allowing the opposing flows to dampen each other. If recycle line 39 is not employed an additional plate (not shown) should be added to diffuser 47 in place of the termination of recycle line 39 to dampen flow from waste line 10.

When the portion of mixed liquor 4 removed from ditch 3 through waste line 10 enters thickener tank 13, sludge will immediately begin to settle, creating a concentrated, or thickened, portion 55 in the lower part of the tank 13 and a clarified portion 56 in the upper part of the tank 13, as shown. As the clarified portion 56 reaches the level of perforated collector pipes 51, it flows out of tank 13 through return line 28. Return line 28 has a first end 29 fluidly connected to thickener tank 13 and a second end 30 fluidly connected to the retention basin 2. Collector pipes 51 connect to a header pipe 52, which connects to return line 28. Perforations 63 are included on the sides and bottoms of collector pipes 51, and are more numerous and of larger diameter as the distance from return line 28 increases, encouraging an even flow into header pipe 52. Collector pipes 51 and header pipe 52 are supported by support structure 62.

As the concentration of solids in basin 2 changes, the concentration of solids in thickener tank 13 will also change, causing fluctuations in the height of concentrated portion 55. Tank 13 should therefore be sized such that the height of concentrated portion 55 does not approach collector pipes 51 during periods of high solids concentration. In order to properly size tank 13, the settlement characteristics of the particular mixed liquor should be analyzed. Prior research performed on particle settling velocity has shown that non-hindered particle settlement achieves a velocity estimated by the following formula:

$$\text{Velocity(ft./hr.)} = \frac{1200}{[(SVI + 100) \times MLSS]^{.57}}$$

Once the settlement velocity is calculated, it is multiplied by the cross-sectional area of the tank 13 above diffuser 47, giving a flow rate in cubic feet per hour, which must equal or exceed the flow rate coming into tank 13 through waste line 10.

Figure 4:
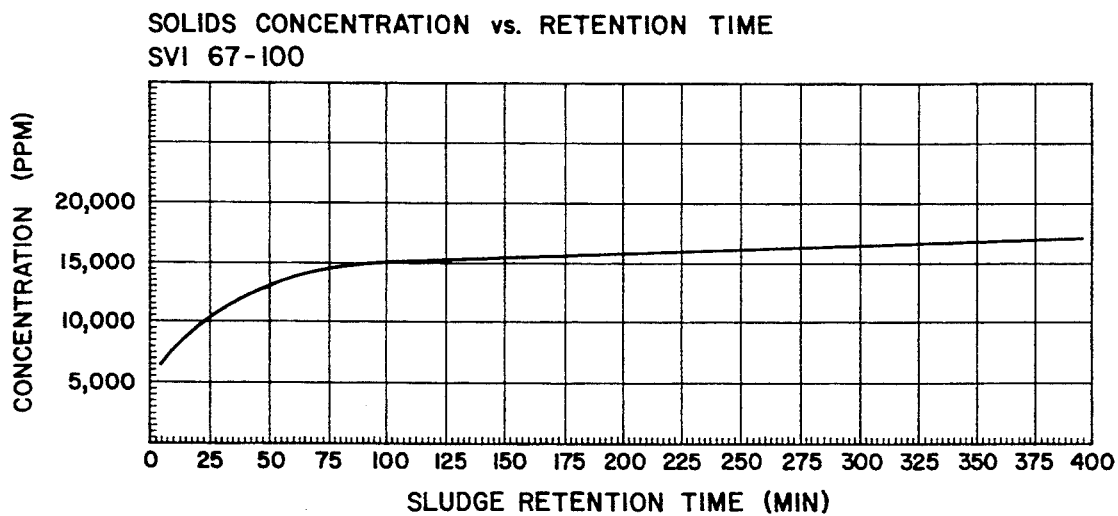
FIG. 4 is a curve showing the relationship of solids concentration versus retention time for mixed liquor in the thickener tank having a sludge volume index of 67-100.
Figure 5:
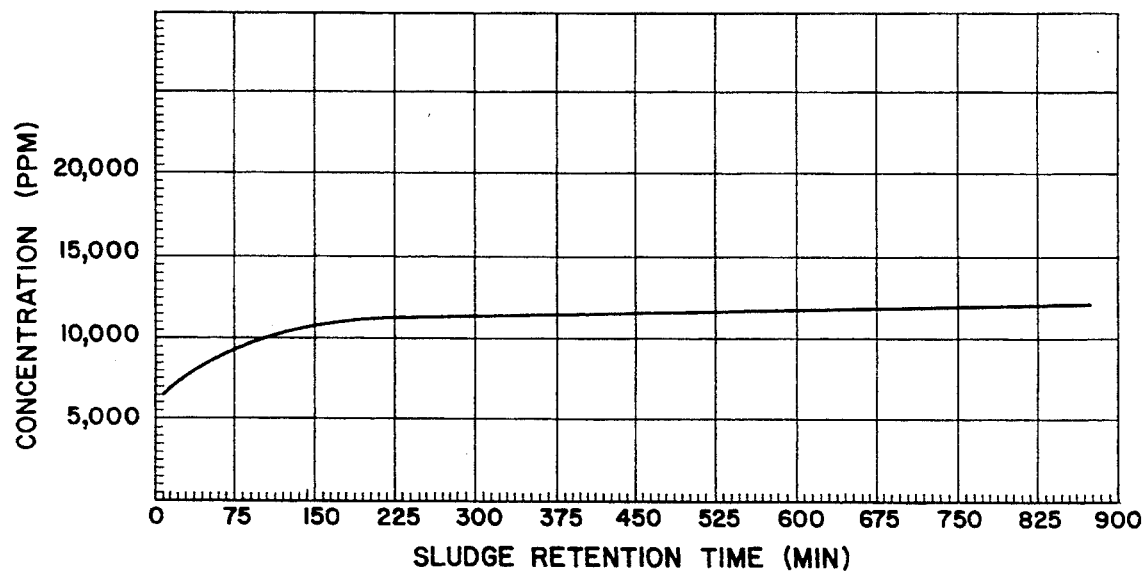
FIG. 5 is a curve showing the relationship of solids concentration versus retention time for mixed liquor in the thickener tank having a sludge volume index of 130-155.

FIGS. 4 and 5 depict the relationship of retention time in tank 13 versus the concentration of solids at the bottom 15. As shown, the concentration reaches a substantially constant value as the retention time in tank 13 increases, for a given sludge volume index (SVI). As shown in FIG. 4, for a mixed liquor 4 having an SVI of 67–100, an optimum concentration is safely reached at a retention time greater than 100 minutes. As shown in FIG. 5, for a mixed liquor 4 having an SVI of 130–155, an optimum concentration is safely reached at a retention time greater than 225 minutes. The volume of concentrated portion 55 in cubic feet divided by the pumping rate of second pump 27 in cubic feet per minute will give a value for sludge retention time in minutes. Thus, the rate of removal through sludge removal line 20 should be such that the optimum retention time is reached, maximizing the thickness of sludge removed and minimizing the amount of water removed by second pump 27 through sludge removal line 20. Most of the water is removed in clarified portion 56. A means 53 may be provided for maintaining a desired level of concentrated portion 55 within tank 13. Means 53 may take any form known in the art, such as a level controller 54 having sensors 64,65 which sense when the level of concentrated portion 55 exceeds or falls below a desired level. For example, when the level of concentrated portion 55 rises above upper sensor 64, controller 54 (such as a BTG Model SMS-3000 Solids Monitoring System) will activate second pump 27. When the level of concentrated portion 55 falls below lower sensor 65, controller 54 will deactivate second pump 27.

If the clarified portion 56 is of sufficient quality, flow through return line 28 may be diverted through a clarified fluid line 32, utilizing a flow selection means 33, such as return valve 34 and clarified fluid valve 35. Flow selection means 33 may be controlled by a means 36 for determining clarity of fluid and a control means 37, such as a combination turbidity meter and automatic valve control 38, which will select a flow path dependent upon the clarity of fluid in return line 28.

Figure 2:
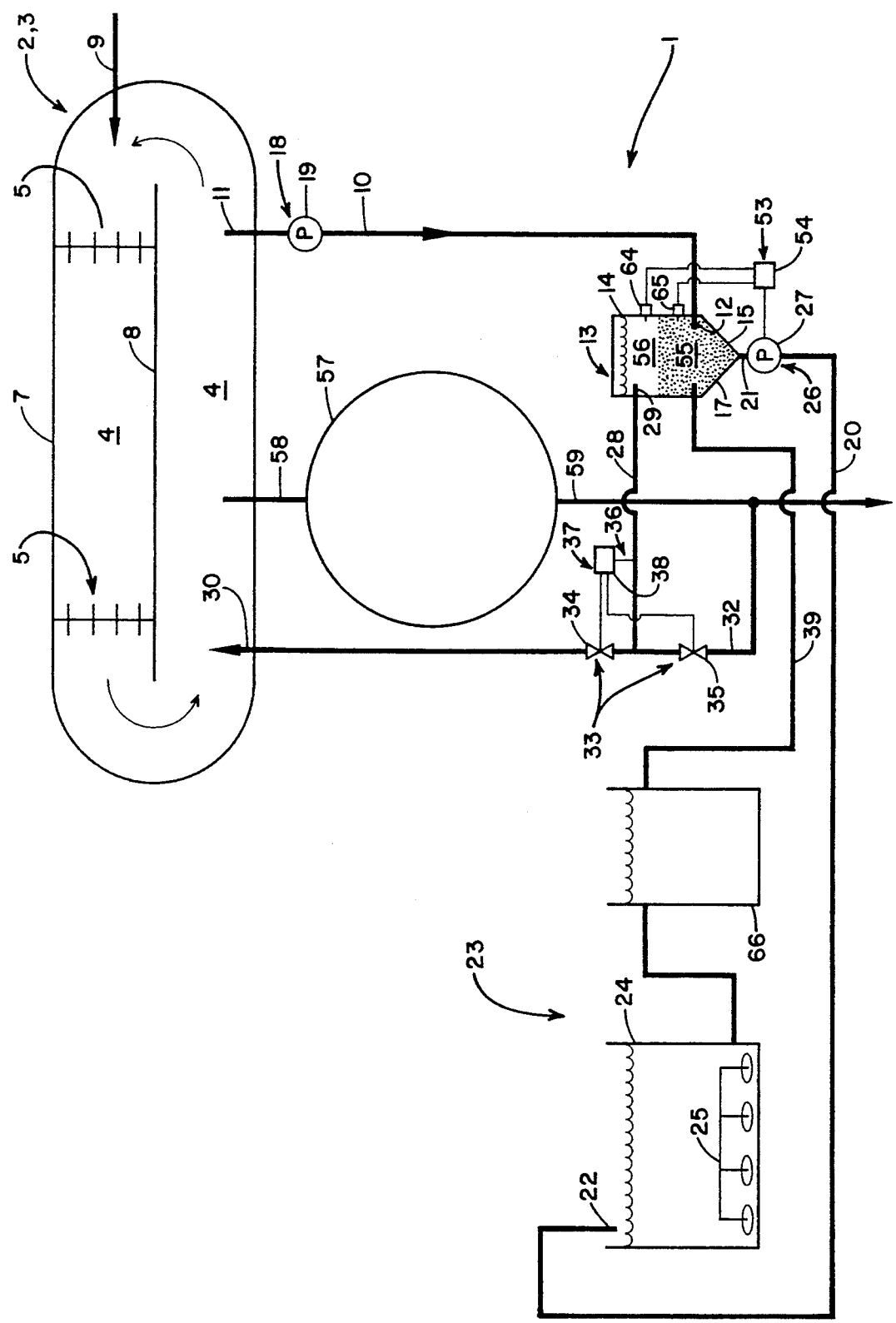
FIG. 2 is a schematic depiction of another embodiment of the system of the invention.

As shown in FIG. 2, sludge removal line 20 may be connected to a digester 24. The digester 24 may be connected to a decant tank 66. In decant tank 66, sludge is settled for removal, and clarified fluid is decanted and sent through recycle line 39 back to thickener tank 13 for further thickening, thus further minimizing the amount of water in digester 24.

As can be seen, the system 1 is extremely versatile. When used with an intrachannel clarifier 6 (shown in FIG. 1), waste line 10 may be connected to intrachannel clarifier 6 so as to remove more concentrated mixed liquor 45 from within the clarifier 6. However, the system 1 may just as easily be used as shown in FIG. 2, removing mixed liquor 4 directly from the basin 2. The system 1 and method described herein allows treatment plants to maintain a constant sludge age, stabilizing plant biology, while decreasing the water content of sludge removed from the plant. Other embodiments of the invention will occur to those skilled in the art, and are intended to be included within the scope and spirit of the following claims.

I claim:

1. In an extended aeration wastewater treatment system including a retention basin, a wastewater inlet fluidly connected to said retention basin and a retention basin exit line fluidly connected to said retention basin, said system having wastewater flowing into said retention basin through said wastewater inlet so as to form mixed liquor within said retention basin, said wastewater being treated in said basin and then flowing out of said basin through said retention basin exit line, a mixed liquor wasting system, comprising:

a. a thickener tank, having a sidewall and a bottom;
   b. a waste line having a first end and a second end, said first end fluidly connected to said retention basin, and said second end fluidly connected to said thickener tank;
   c. a first flow control means for continuously removing a portion of said mixed liquor from said basin at a desired constant flow rate through said waste line, fluidly connected to said retention basin;
   d. a sludge removal line having a first end and a second end, said first end fluidly connected to said bottom of said thickener tank, and said second end fluidly connectable to a sludge disposal system;
   e. a second flow control means for removing a concentrated portion of said mixed liquor from said thickener tank, fluidly connected to said thickener tank; and
   f. a return line having a first end and a second end, said first end fluidly connected to said thickener tank above said bottom, and said second end fluidly connected to said retention basin.

2. A mixed liquor wasting system according to claim 1, wherein said thickener tank further includes a baffle, positioned in said tank above said bottom.

3. A mixed liquor wasting system according to claim 1, further comprising a clarified fluid line, fluidly connected to said return line, and a flow selection means for diverting flow through said clarified fluid line, connected to said return line and said clarified fluid line.

4. A mixed liquor wasting system according to claim 3, further comprising a means for determining clarity of fluid in said return line, connected to said return line.

5. A mixed liquor wasting system according to claim 4, further comprising a control means for controlling said flow selection means, operatively connected to said means for determining clarity of fluid in said return line and said flow selection means.

6. A mixed liquor wasting system according to claim 1, further comprising a sludge disposal system, fluidly connected to said sludge removal line.

7. A mixed liquor wasting system according to claim 6, further comprising a recycle line, fluidly connecting said sludge disposal system and said thickener tank.

8. A mixed liquor wasting system according to claim 1, wherein said bottom of said thickener tank has a sloped portion, sloping inward from said sidewall.

9. A mixed liquor wasting system according to claim 8, further comprising a mixer including a motor attached to said thickener tank, a shaft rotatably attached to said motor and extending vertically downward into said thickener tank, and a blade fixedly attached to said shaft and positioned just above said bottom, said thickener tank further including a baffle, positioned in said tank above said blade.

10. A mixed liquor wasting system according to claim 9, further comprising a resilient scraper extension fixedly attached to said blade and extending downward so as to lightly touch said bottom.

11. A mixed liquor wasting system according to claim 1, further comprising a mixer including a motor attached to said thickener tank, a shaft rotatably attached to said motor and extending vertically downward into said thickener tank, and a blade fixedly attached to said shaft and positioned just above said bottom, said thickener tank further including a baffle, positioned in said tank above said blade.

12. A mixed liquor wasting system according to claim 11, further comprising a resilient scraper extension fixedly attached to said blade and extending downward so as to lightly touch said bottom.

13. A mixed liquor wasting system according to claim 1, wherein said first flow control means comprises a pump.

14. A mixed liquor wasting system according to claim 1, wherein said second flow control means comprises a pump.

15. A mixed liquor wasting system according to claim 1, further comprising a means for maintaining a desired level of said concentrated portion within said thickener tank.

* * * * *